Patented Dec. 29, 1931

1,838,641

UNITED STATES PATENT OFFICE

COLIN JAMES SMITHELLS, OF BUSHEY, ENGLAND

MANUFACTURE OF CHROMIUM AND ALLOYS

No Drawing. Application filed March 31, 1931, Serial No. 526,771, and in Great Britain May 10, 1930.

This invention relates to the manufacture of chromium and of alloys of chromium with other metals, particularly nickel.

One method of manufacture of such metals comprises melting the pure metals in hydrogen. We have now found that the quality of metals prepared by this method is improved if the hydrogen is replaced by nitrogen, or other inert gas, before the melted metal is allowed to cool. In particular the replacement of the hydrogen by nitrogen results in a greater freedom from blow-holes, especially when the metal is cast in air.

The reason is probably this. The hydrogen acting on the molten metal reduces traces of chromium and other oxides, which are inevitably present even in the purest materials. If the reduction of these oxides is not perfectly complete when the metal is allowed to cool, the hydrogen dissolved in the metal continues to react with the oxides and generates steam, which forms blow holes. If no oxides are present, the dissolved hydrogen remains occluded in the metal and does not generate blow holes; but if the metal is exposed to air subsequently in casting, the hydrogen reacts with the oxygen and forms blow holes. Accordingly, even if the melting in hydrogen is carried so far that all the oxides are reduced, there is still an advantage in removing the dissolved hydrogen, if the metal is to be cast in air. The replacement of the hydrogen by inert gas before casting allows the dissolved hydrogen to diffuse out of the metal, so that no blow holes are formed by its reaction with oxides or oxygen.

According to the invention chromium or alloys of chromium are melted in an atmosphere of hydrogen which is replaced by an atmosphere of an inert gas before the metal is allowed to cool. Alternatively the metal may be allowed to cool in hydrogen, the hydrogen replaced by nitrogen and the metal re-melted in nitrogen; but there does not seem to be any advantage in the alternative process.

The time during which the melted metal must be allowed to remain in the inert gas after it has been introduced in replacement of the hydrogen depends on its volume. If the inert gas is nitrogen and the metal weighs a few pounds, the time is about 15 seconds; if it weighs a few hundredweight, the time is rather more than a minute. If the nitrogen is left too long in contact with the molten metal, chromium nitride begins to form, and yellow crystals will be found in the metal. It is to be understood that the use of pure materials as the starting point of manufacture according to the invention is not essential. Commercial chromium made by reduction of the oxide by aluminum, or a similar reaction contains so much oxide that its reduction by hydrogen occupies a very long time; moreover metal containing chromium oxide attacks refractories far more vigorously than pure metal. For these reasons it is highly desirable to start with pure materials but the invention is also applicable to a manufacture starting from impure materials.

I claim:—

1. A process for the manufacture of chromium and chromium alloys which comprises melting the metal in hydrogen and then replacing the hydrogen by an inert gas.

2. A process for the manufacture of chromium and chromium alloys which comprises melting the metal in hydrogen, replacing the hydrogen by an inert gas and maintaining the metal molten in the inert gas until the dissolved hydrogen has diffused out of the metal.

3. A process for the manufacture of chromium and chromium alloys which comprises melting the metal in hydrogen and then replacing the hydrogen by nitrogen.

4. A process for the manufacture of chromium and chromium alloys which comprises melting the metal in hydrogen, replacing the hydrogen by nitrogen and maintaining the metal molten in the nitrogen until the dissolved hydrogen has diffused out of the metal.

5. A process for the manufacture of chromium and chromium alloys which comprises melting the metal in hydrogen, allowing the metal to cool in hydrogen, replacing the hydrogen by nitrogen and re-melting the metal in nitrogen.

COLIN JAMES SMITHELLS.